Figure 3:
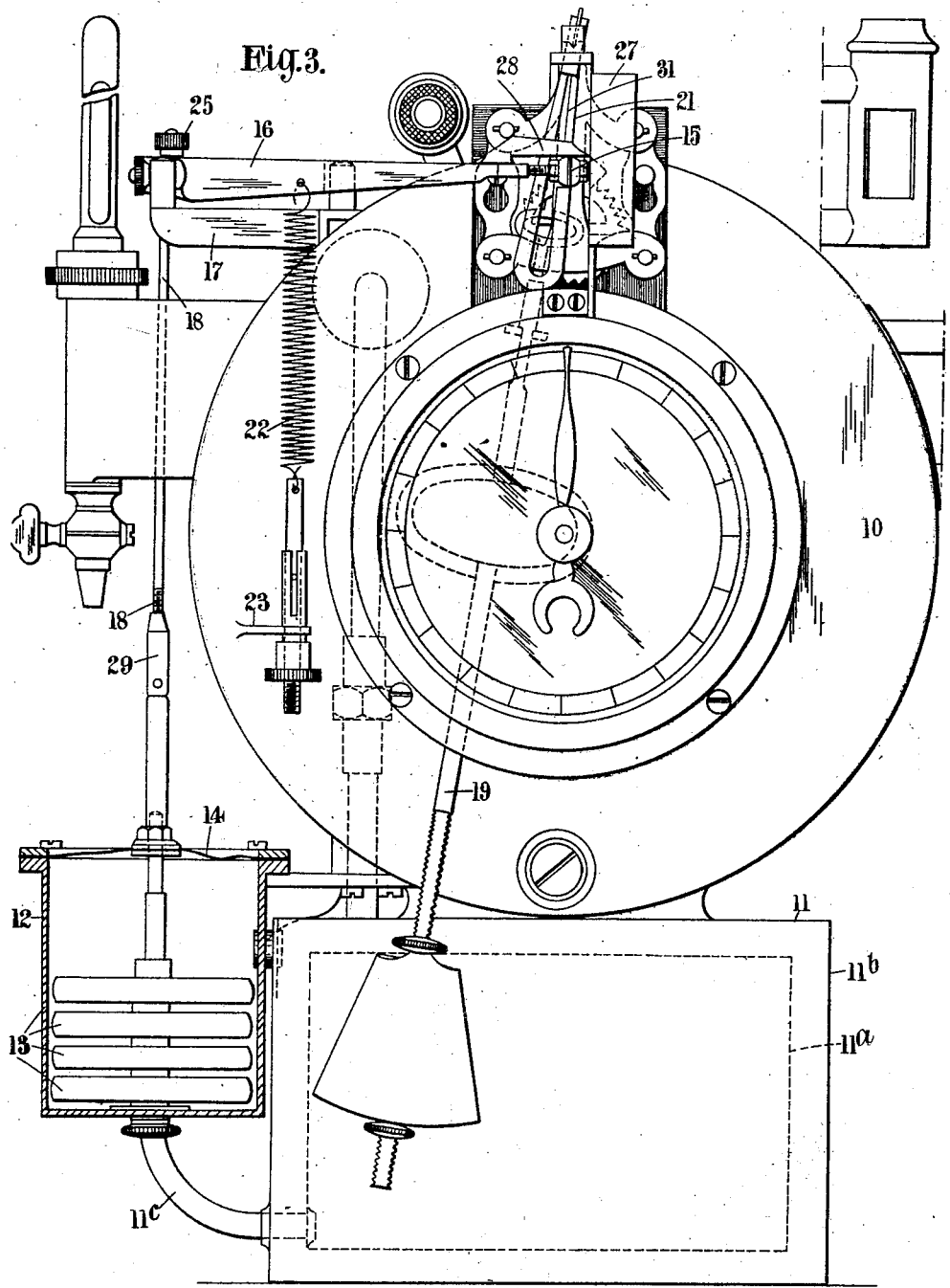

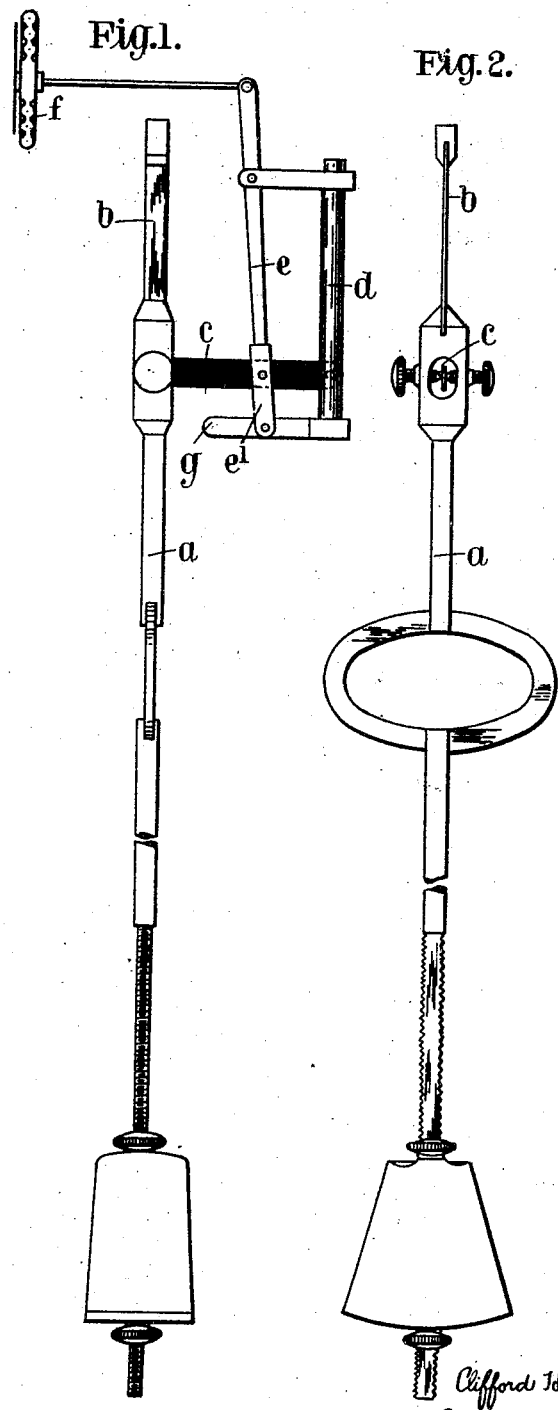

Sept. 11, 1928.

C. H. BEASLEY 1,683,648

ESCAPEMENT CONTROLLING MECHANISM

Filed June 11, 1923

5 Sheets-Sheet 2

INVENTOR
Clifford Howell Beasley,
By:— Fowler & Smith,
Attorneys.

Sept. 11, 1928.  
C. H. BEASLEY  
1,683,648  
ESCAPEMENT CONTROLLING MECHANISM  
Filed June 11, 1923  5 Sheets-Sheet 3
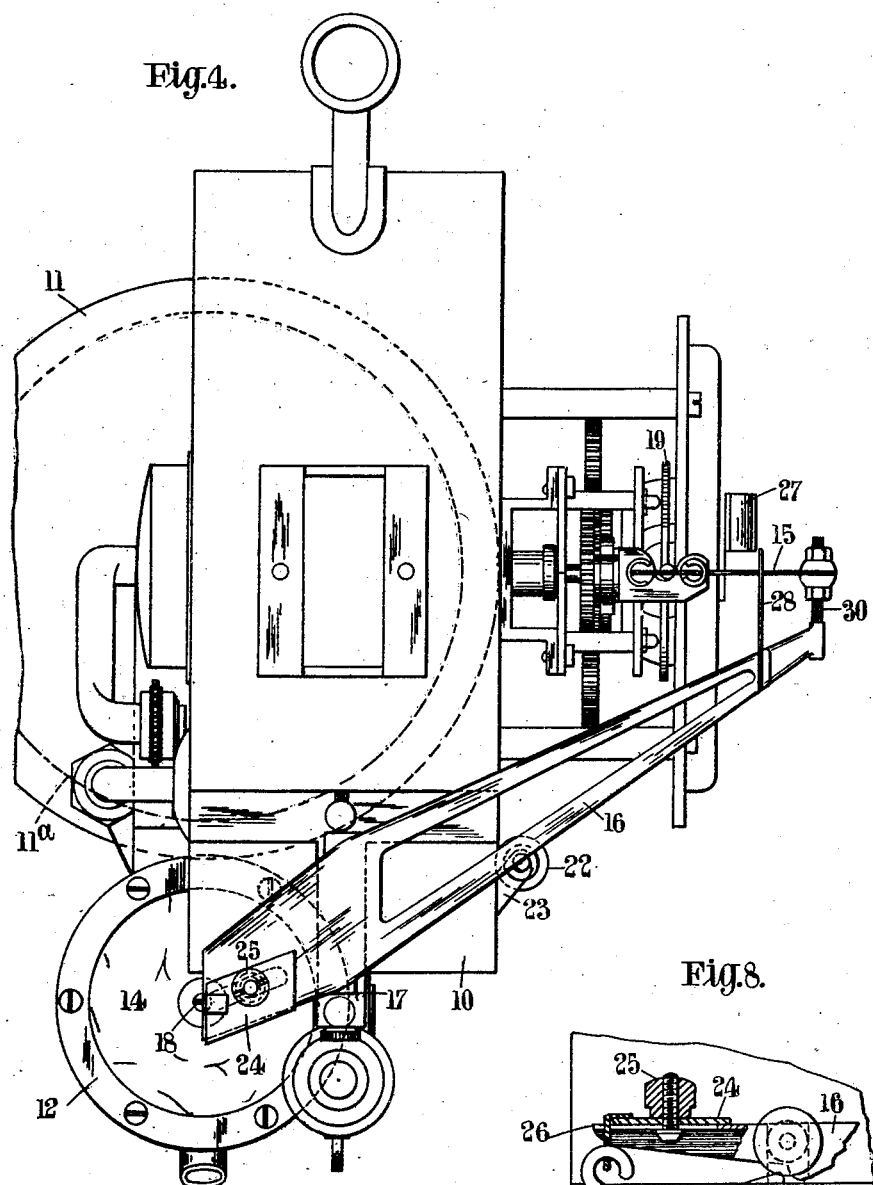
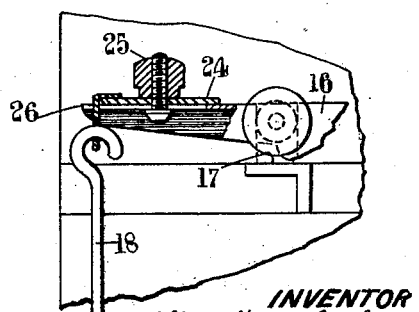
INVENTOR  
Clifford Howell Beasley,  
By:- Fowler and Smith,  
Attorneys.

Sept. 11, 1928.
C. H. BEASLEY
1,683,648
ESCAPEMENT CONTROLLING MECHANISM
Filed June 11, 1923    5 Sheets-Sheet 4
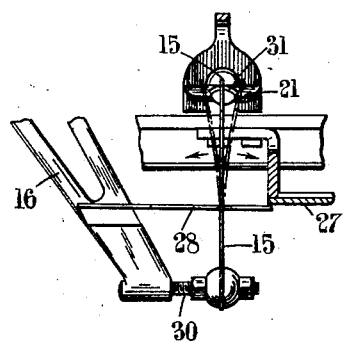
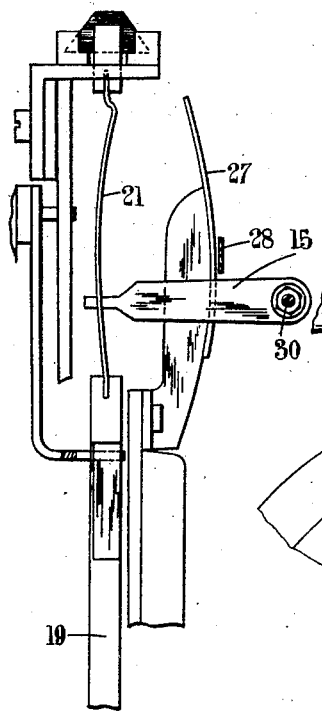
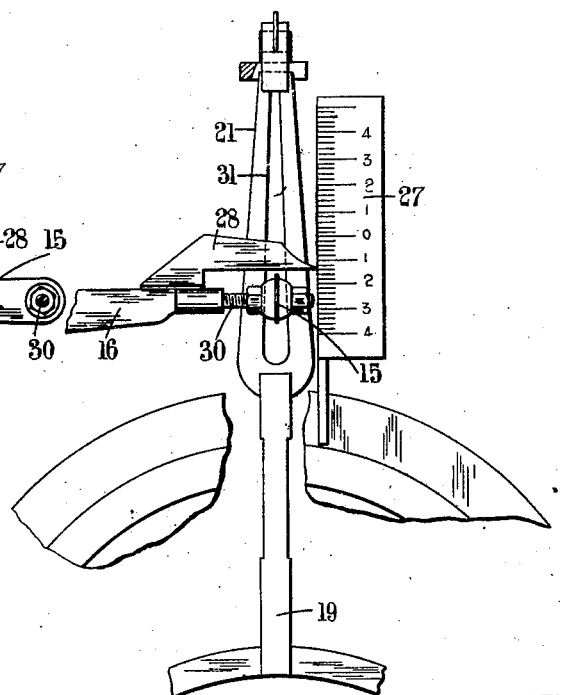

Sept. 11, 1928.  1,683,648
C. H. BEASLEY
ESCAPEMENT CONTROLLING MECHANISM
Filed June 11, 1923   5 Sheets-Sheet 5
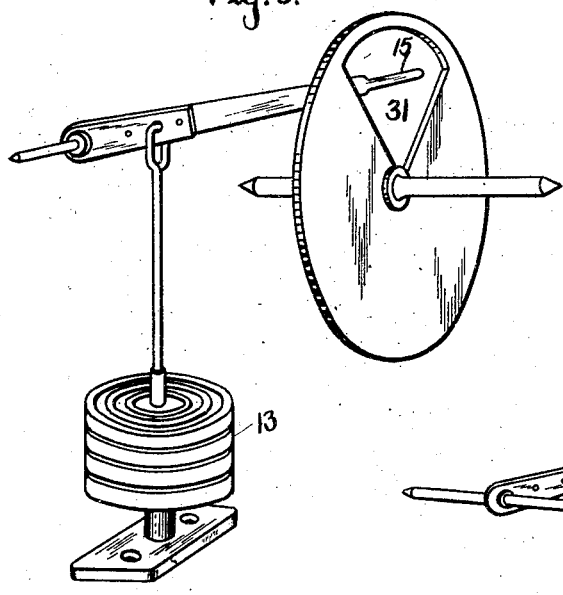
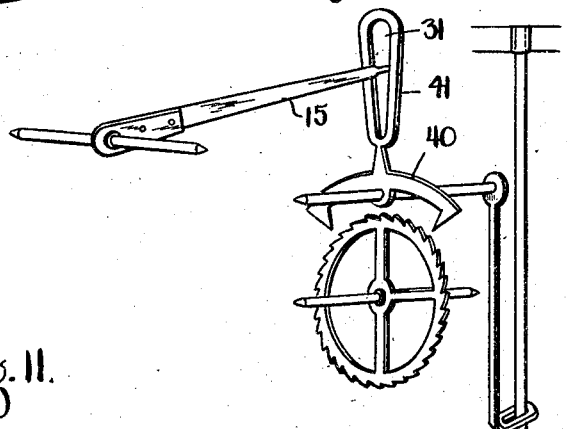
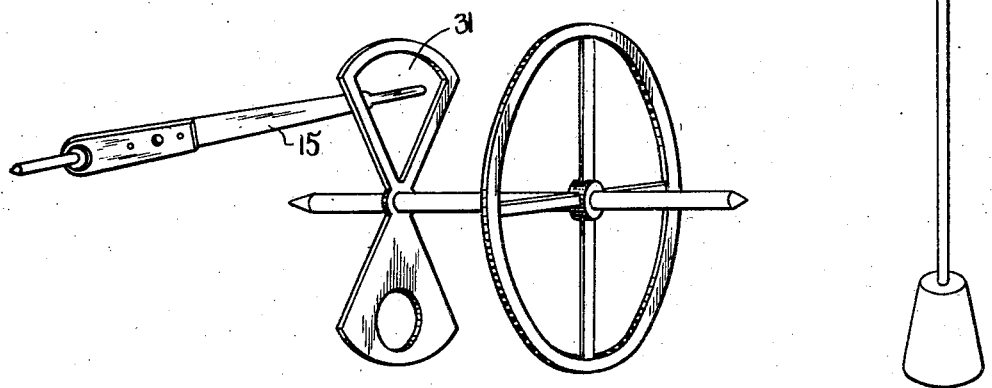
INVENTOR:—
Clifford H. Beasley,
By:— Fowler and Smith,
Attorneys Patented Sept. 11, 1928.

1,683,648

UNITED STATES PATENT OFFICE.

CLIFFORD HOWELL BEASLEY, OF BIRMINGHAM, ENGLAND, ASSIGNOR OF ONE-HALF TO PARKINSON AND W. & B. COWAN LIMITED, OF BIRMINGHAM, ENGLAND, A CORPORATION OF GREAT BRITAIN.

ESCAPEMENT-CONTROLLING MECHANISM.

Application filed June 11, 1923, Serial No. 644,675, and in Great Britain June 20, 1922.

This invention has reference to means for automatically varying the going rate of a clock-escapement controlling mechanism embodying an oscillating controlling element (i.e. a pendulum or balance wheel) and is particularly applicable to clock-escapement controls for use in connection with fluid or liquid metering apparatus, such as apparatus for governing or regulating the delivery of gas to recording, testing, standardizing and similar instruments.

The said invention is primarily intended to be applied for the purpose of automatically compensating for or correcting the effects of variations in barometric or other pressure and temperature on the volume of a gas or other fluid flowing through an escapement controlled metering apparatus, in order to ensure the delivery by the said apparatus of a constant and pre-determined quantity or volume of gas per time unit irrespective of varying pressure and temperature conditions; the preferable form of the invention being adapted to vary the volume delivered proportionally to the pressure and temperature in such a way as to maintain a constant quantity supply, equal to a standard volume at normal temperature and pressure.

In connection with clock-controlled apparatus for regulating the supply of gas to recording calorimeters and analogous instruments of the type shown in Patent 985,722, issued to Fredric G. Beasley, under date of February 28, 1911, and in which a pendulum controls the governing escapement of a gas-driven drum or equivalent measuring device, it has been proposed to correct for temperature and pressure changes by an aneroid-operated mechanism comprising a lever from which the pendulum is suspended and which, under displacement by the aneroid, bodily raises or lowers the pendulum and alters the position of its suspension spring relatively to a fixed fulcrum wherewith the said spring is slidably engaged, the result being to increase or decrease the oscillation arc of the pendulum and retard or accelerate the going rate of the escapement mechanism and the speed of the gas-driven drum controlled thereby. But in this and other known mechanism where the regulation of an escapement mechanism is dependent upon varying the length of a pendulum, the rate of variation in the speed of the escapement mechanism is not proportional to the amount by which the pendulum length is altered inasmuch that the rate will vary according to the well known law of physics relating to pendulums, i. e., the period of vibration or the time taken for a pendulum to move from one end of its beat to the other end and back again is expressed by the formula $$T = 2\pi\sqrt{\frac{l}{g}}$$

where $T$=time; $l$= length of rod in feet; and $g$=acceleration of gravity.

The apparatus that constitutes the present invention is applicable to escapement mechanism having either pendulum or balance-wheel control and comprises an aneroid or equivalent device susceptible to changes in temperature and pressure, in mechanical connection with a brake or compensator device which engages the pendulum or balance wheel, or some element oscillating pro rata therewith, and is adapted to change the oscillation arc of such element by imposing thereon a variable resistance, determined by and changing with the variations in temperature and pressure conditions that originate movement in the aneroid or its equivalent. The preferred method of applying the said invention provides, as hereinafter described, for the variation of the oscillation arc and speed of the oscillating element, by a displacement of the brake device in direct proportion, or substantially direct proportion, to the displacement produced at or originating in the susceptible device; the brake device, when used for controlling a pendulum, being displaced according to the formula $R = \dfrac{D}{L}$ (where $R$=resistance obtained by the use of the brake or compensator spring; $D$=distance through which the brake is displaced and $L$=the pendulum length).

A variable resistance control may be obtained by the use of a brake or compensator spring which has a fixed or invariable point of engagement with the oscillating element and whose effective length is altered by the aneroid-operated mechanism, but preferably, and where proportional control is required the apparatus comprises a displaceable brake or compensator spring whose point of incidence on the oscillating element is varied or shifted in relation to the point of oscillation. Or alternatively, the control may be obtained by varying the deflection arc of the spring and changing its incidence point.

Figures 1 and 2 of the accompanying drawings represent diagrammatically, an aneroid-operated compensating mechanism, adapted to be applied to the pendulum of a mechanism embodying the governing escapement of a gas-driven metering drum, in which the resistance factor of the brake or compensator spring is varied by altering its effective length.

Figure 3 shows the complete apparatus in front elevation and illustrates the general arrangement of the compensating spring, the sensitive capsule device and the mechanism for transmitting motion originating in the aneroid to the said compensator, Figure 4 is a plan view of Figure 3, Figures 5 and 6 are detail views showing more clearly, in side and front elevation, the disposition of the compensator spring and its engagement with the pendulum, Figure 7 is a sectional plan view showing the interconnection between the compensator and pendulum, the dotted lines indicating how the compensator spring is laterally deflected by the pendulum when exerting its brake effect on the latter, Figure 8 is a detailed view of a leverage-varying adjustment that is embodied in the short arm of the multiplying lever of the transmission from the capsules to the compensator, Figure 9 is a perspective view of a modification of my device in which a tapered "proportioning" slot is formed in a balance wheel and is engaged by the free end of the shiftable incidence compensator-spring 15, Figure 10 is a perspective view in which the tapered slot is formed in an extension from the pallet of an escapement, which pallet is connected to and oscillates pro rata with a pendulum, and, Figure 11, is a perspective view of a mechanism in which the tapered slot is formed in some element oscillating pro rata with a balance wheel.

In this constructional form of compensator shown in Figures 1 and 2, which (although not adapted to give proportional control) is designed to eliminate the effects of friction and other disturbing factors, and ensure perfect sensitivity to the smallest variations in pressure and temperature conditions, the pendulum $a$ is suspended in the usual way from the spring $b$ and is engaged at a point below the suspension spring by the free extremity of a brake or compensator spring $c$ which constitutes the variable-resistance element of the mechanism. The spring $c$, in this particular example, is disposed horizontally behind, and at right angles to the plane of oscillation of, the pendulum, and whilst its one end is engaged with the pendulum as above stated, the other end is anchored to a bracket or other fixture $d$; this anchorage being disposed in the same vertical plane as the oscillation point of the pendulum. The same bracket also supports a vertical lever $e$ that is fulcrumed to oscillate in the vertical plane that contains the compensator spring anchorage $d$ and whose upper end is connected, by a suitably transmission arrangement with the diaphragm of an aneroid or other susceptible device $f$, whilst the lower arm contains a fork, loop, or equivalent formation $e'$ that rides on the compensator spring intermediate the anchored end of the latter and the pendulum. The lever is preferably extended below the spring and has some sliding engagement with a suitably-disposed rigid stabilizer or flat-sectioned guide-tongue $g$ which prevents or takes up side play in the said lever and constrains the latter to oscillate in the one plane exactly at right angles to the plane of the pendulum oscillation. Pointed adjusting screws may be arranged between the lever and the rigid guide for taking up side play and ensuring effective but frictionless support for the said lever, and a similar pair of pointed adjusting screws or contacts may be carried in opposite sides of a loop in the pendulum rod; the free end of the compensator spring being engaged between the points of the said screws for making connection of the same with the pendulum rod.

The fork, loop, or equivalent rider of the lever may be an exact fit on the compensator spring, or one or both sides of such rider may be fitted with pointed screws or contacts permitting of delicate or exact adjustment of the connection between the lever and spring so that there is no side play or lost motion, and the whole of the parts are arranged so that only a very slight force is required to traverse or displace the lever relatively to the spring for altering the position of the said fork relatively to the anchored end of the said spring.

Each such alteration of the position of the lever-fork in synchronism with movement transmitted from the aneroid or the like alters the length of the effective flexible portion of the said spring (i. e. the portion between the rider contacts and the point of its connection to or engagement with the pendulum) and correspondingly varies the braking effect or resistance imposed by the said spring on the pendulum oscillations, with the result that even the slightest effort or movement originating at the diaphragm of the aneroid or the like is translated into a variation of the brake-spring resistance that effects a definite alteration in the pendulum rate.

The compensator mechanism described provides for the automatic variation of the pendulum rate by amounts determined by the distance through which the fork or loop is displaced or traversed along the spring by each displacement of the aneroid-operated lever; and further, although the effective portion of the compensating spring flexes in conformity with the pendulum oscillations, there is always a point in its flexing path where the whole of the spring lies in a straight line between the pendulum and the anchor-bracket, and in which the compensating lever form can traverse or alter its position, without the spring opposing any frictional resistance to such movement.

Another application of the invention, which provides for proportional control being realized, involves the use of a brake or compensator spring which is displaceable in the plane containing the fulcrum of a pendulum or balance wheel, or some other oscillating element connected with a pendulum or balance-wheel. A proportional control apparatus in accordance with such application is shown in Figures 3 to 11 of the drawings embodied in the pendulum-escapement mechanism of a meter for delivering measured quantities of gas to calorimeters and the like. In these figures, like numerals are employed to designate similar parts throughout the several views.

In its general arrangement, the pendulum-controlled escapement mechanism of the metering apparatus is of a known construction, and, therefore, calls for no particular description in this specification, but to provide for the embodiment of the present invention in such a meter, the metering drum casing 10 is mounted on a tank-base 11 that supports a cylinder or casing 12 containing a series of inter-communicating air-filled capsules 13 so arranged that the sum of any movement generated or originating therein by the effect of changes in temperature and pressure is conveyed to a flexible diaphragm 14 and is thence transmitted to the pendulum-controlling compensator device as hereinafter described.

The base 11 comprises an air tank 11$^a$ enclosed in a gas tank 11$^b$, the latter having an intake orifice in communication with the metering part of the apparatus and an outlet connection leading into the cylinder 12, so that gas passing from the meter proceeds through the outer tank and into the cylinder before passing on to the calorimeter or the like to which the gas is being delivered, whilst the inner or air-tank 11$^a$ communicates through a pipe 11$^c$ with the interiors of the system of capsules, as shown in Figure 3. By this arrangement, the temperature of the air in the inner tank and in the capsules is maintained at the same temperature as the gas delivered from the meter and varies as the gas temperature varies.

Referring now to the compensator or corrector device, this comprises a spring blade or tongue 15 carried on the forward end of the long arm of a multiplying lever 16 which is fulcrumed to a bracket 17 (see Figures 3 and 4) on the side of the meter; the short arm of this lever being connected by an adjustable coupling rod 18 to the diaphragm 14 of the cylinder 12.

The connection of the forward or fixed end of the compensator spring with the multiplying lever is located (when the apparatus is adjusted to the N. T. P. zero as hereinafter described) in the same vertical plane as the fulcrum of the pendulum 19 and its free on unanchored inner end engages (as best shown in Figure 7) with a vertical slot 20 formed in the part 21 of the pendulum; the arrangement being such that any motion originating in and transmitted from the capsules as the result of variations in gas temperature and barometric pressure displaces the multiplying lever and compensator spring and so changes or alters the point of incidence of the latter upon the pendulum as to produce the necessary compensating alterations in the pendulum oscillation arc. For instance, when a temperature or pressure effect causes the density of the gas being delivered to fall, that effect simultaneously influences the capsules and produces a displacement of the compensator device which permits of such a change in the braking effect on the pendulum, controlling escapement and metering drum as will result in the delivery of a greater volume of gas per time unit to compensate for the decrease in density, whilst conversely, where a temperature or pressure change increases the density of the gas, the same cause originates a capsule movement which is translated into a shifting of the compensator for effecting a corresponding change in the braking effect on the pendulum and metering drum and reducing the gas volume per time unit.

To take up play or prevent lost motion in the transmission system, a light adjustable spring 22 is interposed between the long arm of the multiplying lever and a suitable anchorage such as 23, whilst to provide a means for varying the length of the short arm of the said lever, an adjustment such as shown in Figure 8 may be incorporated. This consists of a slide 24 which is normally clamped to the slotted arm of the lever by a clamping device 25 and with which the coupling rod leading from the diaphragm 14 is connected; the arrangement being such that by slacking off the device 25 and moving the slide along the arm, the distance between the coupling-rod connection and the fulcrum of the multiplying lever can be altered to any extent within the limits imposed by the length of the slot 26.

To facilitate adjustment of the compensator device, the front of the apparatus is provided with a fixed scale plate 27 (see Figure 6) marked off with a scale of graduations and figures above and below a central zero point whilst a pointer 28 is mounted on a long arm of the multiplying lever, immediately above the anchored end of the compensator blade, to traverse the said scale with the lever displacements. A screw adjusting device is also incorporated at 29 in the coupling rod 18 by the manipulation of which, in adjusting the instrument to give a zero N. T. P. reading, the lever and compensator can be readily set to that position in relation to the pendulum where the pointer 28 registers with the zero mark of the scale 27. An adjustment 30 (see Figures 6 and 7) may also be introduced between the connection of the compensator spring and lever to provide for a lateral displacement of the said compensator in relation to the perpendicular plane containing the pendulum fulcrum.

The corrective effect of this shiftable-incidence device produced by the bending of the spring on impingement of a pendulum or equivalent oscillating element against its free end may be proportioned to, or calibrated on, the temperature and pressure variations for which correction has to be made by introducing into the mechanism (such as at the connection of the flexing end of the spring with the oscillating element) a means for equalizing the deflection factor and determining its effect on pendulum speed throughout the whole or any desired part of its range of vertical displacement relatively to the oscillating element. For instance, where it is desired that the arc of spring-deflection shall be a constant imposing on the same resistance effect on the oscillation element at all its varying incidence points, the said oscillating element may be formed with a taper-sided slot (i. e. a slot having a contour of a sector of the oscillation arc of the said element) within which the free end of the spring is engaged.

The application of the invention to a pendulum escapement mechanism as shown in Figures 3 and 8 embodies a proportioning device in the form of a taper slot or aperture 31, cut in the part 21 of the pendulum and engaged by the free or deflectable end of the compensator. This particular formation is designed to render the compensator brake factor a constant at all positions within its range of vertical displacement (that is to say, it is designed to eliminate effects, such as would occur if the spring engaged a parallel sided slot in the pendulum, due to increases in the bending arc of the said spring consequent on the shiftings of the point of incidence further from the pendulum fulcrum, and provides for the pendulum rate being governed by one factor only, viz. the distance of its incidence point from the pendulum fulcrum) and it is, therefore, given the shape or contour of a sector of the pendulum oscillation arc, which permits of the pendulum, at any given position of the compensator, having a certain arc of free swing before the sides of the proportioning slot impinge on and produce lateral deflection of the free end of the spring. This is best illustrated in Figure 7, where the compensator is shown in full lines occupying the centre of the slot as when the pendulum is at the bottom of its oscillation, whilst the dotted lines show the said compensator as laterally deflected in opposite directions by alternate impingement of the opposite edges of the pendulum slot against its free end, which occurs after the pendulum has made its free swing as provided for by the shape of the said slot.

The shape or contour of this proportioning slot or equivalent may, however, be so selected as regards its shape or formation that resistance to the oscillatory element is produced by varying the spring deflection arc of the compensator instead of or in addition to changing its incidence point.

Where a shiftable incidence brake spring is used to give proportional control in an escapement mechanism embodying a balance wheel, the proportioning slot or equivalent device with which the brake spring is engaged may be formed in or upon the balance wheel itself as shown in Figure 9, or in or upon some element connected to and oscillating pro rata with the said wheel, as shown in Figure 11. In Figure 9, a tapered proportioning slot 31 is formed in the balance wheel and is engaged by the free end of the shiftable incidence compensator-spring 15. In Figure 11 a tapered slot 31 is formed in some element oscillating pro rata with the balance wheel. When it is desired to use the mechanism in connection with an element which oscillates pro rata with a pendulum, I employ the device illustrated in Figure 10, which shows an arrangement in which the tapered proportioning slot 31 is formed in an extension 41 from the pallet 40 of an escapement, which pallet is connected to, and oscillates pro rata with a suitable pendulum.

The several forms of invention herein described in their application to the controlling clocks of gas or other fluid meters may also be applied to liquid meters involving a rotating spindle for driving the index gear; the spring-controlled pendulum or equivalent oscillating device being adapted to the escapement on such spindle in substantially the same manner as already described in connection with fluid meters. Then, given sufficient power in the escapement and in the compensator device, the quantity per time unit of the liquid delivered by the meter would be varied in some proportion controlled by an aneroid or like susceptible device, which might be surrounded by air, or by some liquid such as by the liquid being metered.

Having described my invention, what I claim and desire to secure by Letters Patent is:—

1. A device for governing the action of escapement mechanism having an oscillating element and comprising a blade spring, means for supporting the blade spring in cooperative relation with respect to the oscillating element, said oscillating element having a slot through which a portion of the spring extends.

2. A device for governing the action of escapement mechanism having an oscillating element and comprising a blade spring, means for supporting the blade spring in cooperative relation to the oscillating element, said oscillating element having a tapered slot with which a portion of the blade spring coacts.

3. In combination with an oscillating element having a slot therein, a spring brake member having a portion cooperable with the slot of the element to yieldably retard its movements.

4. A device for governing the action of escapement mechanism having an oscillating element and comprising a blade spring, means for supporting the blade spring in cooperative relation to the oscillating element, said oscillating element including converging edges with which a portion of the blade spring coacts.

In testimony whereof I hereunto affix my signature.

CLIFFORD HOWELL BEASLEY.